US009955326B2

(12) United States Patent
Avrahami et al.

(10) Patent No.: US 9,955,326 B2
(45) Date of Patent: Apr. 24, 2018

(54) RESPONDING TO IN-VEHICLE ENVIRONMENTAL CONDITIONS

(71) Applicant: Intel Corporation, Santa Clara, CA (US)

(72) Inventors: Daniel Avrahami, Seattle, WA (US); Jennifer A. Healey, San Jose, CA (US); Ariel Malamud, Santa Clara, CA (US); Lonny Baskin, Tsur Hadassah (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,797

(22) PCT Filed: Oct. 25, 2013

(86) PCT No.: PCT/US2013/066886
§ 371 (c)(1),
(2) Date: Dec. 27, 2013

(87) PCT Pub. No.: WO2015/060868
PCT Pub. Date: Apr. 30, 2015

(65) Prior Publication Data
US 2016/0249191 A1    Aug. 25, 2016

(51) Int. Cl.
*G08B 1/00*        (2006.01)
*H04W 4/22*      (2009.01)
(Continued)

(52) U.S. Cl.
CPC .............. *H04W 4/22* (2013.01); *G08B 21/22* (2013.01); *H04L 67/12* (2013.01); *H04W 4/046* (2013.01); *H04W 4/12* (2013.01); *H04W 4/006* (2013.01)

(58) Field of Classification Search
None
See application file for complete search history.

(56) References Cited

U.S. PATENT DOCUMENTS 5,730,720 A * 3/1998 Sites .................... A61M 1/369
604/27
6,922,147 B1   7/2005 Viksnins et al.
(Continued)

FOREIGN PATENT DOCUMENTS

| CN | 102259629 A | 11/2011 |
|---|---|---|
| CN | 202362894 U | 8/2012 |
| WO | 94/22693 A1 | 10/1994 |

OTHER PUBLICATIONS

International Search Report and Written Opinion received for PCT International Application No. PCT/US2013/066886, dated Jul. 14, 2014, 13 pages.
(Continued)

*Primary Examiner* — Brian Zimmerman
*Assistant Examiner* — Kevin Lau
(74) *Attorney, Agent, or Firm* — Barnes & Thornburg LLP

(57) ABSTRACT

Technologies for generating a warning based on environmental conditions sensed in a vehicle include an in-vehicle warning system for determining whether an operator of the vehicle is present, determining whether a non-operator occupant is present in the vehicle, and determining whether environmental conditions sensed within the vehicle satisfy a reference condition threshold. Such technologies may also include performing an emergency action in response to determining that the environmental conditions sensed within the vehicle satisfy the reference condition threshold, determining that the operator of the vehicle is not present, and determining that the non-operator occupant is present in the vehicle.

23 Claims, 6 Drawing Sheets

(51) Int. Cl.
  *G08B 21/22* (2006.01)
  *H04L 29/08* (2006.01)
  *H04W 4/04* (2009.01)
  *H04W 4/12* (2009.01)
  *H04W 4/00* (2018.01)

(56) References Cited

U.S. PATENT DOCUMENTS

| | | | |
|---|---|---|---|
| 7,111,869 B2* | 9/2006 | David | B60R 21/01538 280/735 |
| 7,170,401 B1 | 1/2007 | Cole | |
| 7,714,737 B1 | 5/2010 | Morningstar | |
| 8,058,983 B1 | 11/2011 | Davisson et al. | |
| 8,212,665 B2 | 7/2012 | Schoenberg et al. | |
| 8,892,302 B1* | 11/2014 | McDonald | G08B 21/24 701/36 |
| 9,014,920 B1* | 4/2015 | Torres | G08B 21/0202 701/45 |
| 2002/0161501 A1 | 10/2002 | Dulin et al. | |
| 2004/0225419 A1* | 11/2004 | Sakai | B60K 28/00 701/1 |
| 2007/0193811 A1 | 8/2007 | Breed et al. | |
| 2008/0125941 A1* | 5/2008 | Mitteer | B60H 1/00742 701/46 |
| 2010/0241309 A1* | 9/2010 | Demirdjian | B60R 21/015 701/36 |
| 2012/0232749 A1 | 9/2012 | Schoenberg et al. | |

OTHER PUBLICATIONS

Arbogast et al.,"Reducing the Potential for Heat Stroke to Children in Parked Motor Vehicles: Evaluation of Reminder Technology," U.S. Department of Transportation, National Highway Traffic Safety Administration, Report No. DOT HS 811 632, Jul. 2012, 43 pages.
Kane, "NHTSA: Aftermarket Devices Unreliable in Detecting Kids Left in Hot Cars," available at: <http://www.thecarconnection.com/news/1078099_nhtsa-aftermarket-devices-unreliable-in-detecting-kids-left-in-hot-cars>, Jul. 31, 2012, 4 pages.
Seeing Machines, "DSS," available at: <http://www.seeingmachines.com/product/dss/>, 2012, 2 pages.
Hardesty, "Researchers amplify variations in video, making the invisible visible," MITnews, available at: <http://web.mit.edu/newsoffice/2012/amplifying-invisible-video-0622.html?tmpl=component>, Jun. 22, 2012, 2 pages.
SBWIRE, "Security Firm Torio is Introducing the First Anti-Theft and Child Protection Car Alarm, Child in Danger Car Alarm System," retrieved from: <http://www.sbwire.com/press-releases/print/263439>, Jun. 10, 2013, 1 page.
Torio, "Child in Danger Car Alarm System," retrieved from: <http://www.indiegogo.com/projects/child-in-danger-car-alarm-system>, accessed on Jul. 18, 2013, 4 pages.
Baby Alert International, "ChildMinder Smart Clip System," retrieved from: <http://babyalert.info/childminder-smart-clip-system.html>, accessed on Jul. 18, 2013, 1 page.
Baby Alert International, "ChildMinder Smart Clip System," User Guide, available at: <http://babyalert.info/media/wysiwyg/products/CMSC_QS.pdf>, 2012, 2 pages.
Office Action, Search Report, and English Translation for Chinese Patent Application No. 201380079811.9, dated Jan. 3, 2017, 28 pages.
European Search Report for Patent Application No. 13895842.6-1853, dated May 19, 2017, 9 pages.
Office Action for Chinese Patent Application No. 201380079811.9, dated Jan. 3, 2017, 10 pages.
Office Action for Chinese Patent Application No. 201380079811.9, dated Aug. 2, 2017, 9 pages.
Third Office Action issued on Jan. 15, 2018 for Chinese Patent Application No. 201380079811.9 with translation, 27 pp.
Dthce Action issued on Feb. 12, 2018 for European Patent Application No. 13895842.6, 8 pp.

* cited by examiner

RESPONDING TO IN-VEHICLE ENVIRONMENTAL CONDITIONS

CROSS REFERENCE TO RELATED APPLICATIONS

This application is a national stage entry under 35 USC § 371(b) of International Application No. PCT/US2013/066886, which was filed Oct. 25, 2013.

BACKGROUND

Each year, an increasing number of children and pets are left in consumer vehicles without adult supervision. In some cases, a parent or caregiver may unintentionally leave a child or pet inside a vehicle. In other cases, however, a parent or caregiver may intentionally leave a child or pet inside a vehicle while the parent or caregiver runs a quick errand. Regardless of the reason why a child or pet is left inside a vehicle, such practice potentially exposes the child or pet to dangerous environmental conditions that can develop inside the vehicle. More specifically, children and/or pets left unintended inside vehicles may be exposed to extreme temperatures (e.g., high or low temperatures), which may be extremely dangerous or even fatal to the children and/or pets.

Consumer vehicles can be equipped with an emergency event reporting service (such as ONSTAR®). Such conventional services typically contact an emergency operator in response to the vehicle being involved in an accident. However, conventional emergency event reporting services lack the ability to alert a caregiver and/or emergency services in response to a child and/or pet being left inside a vehicle having unsafe environmental conditions.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
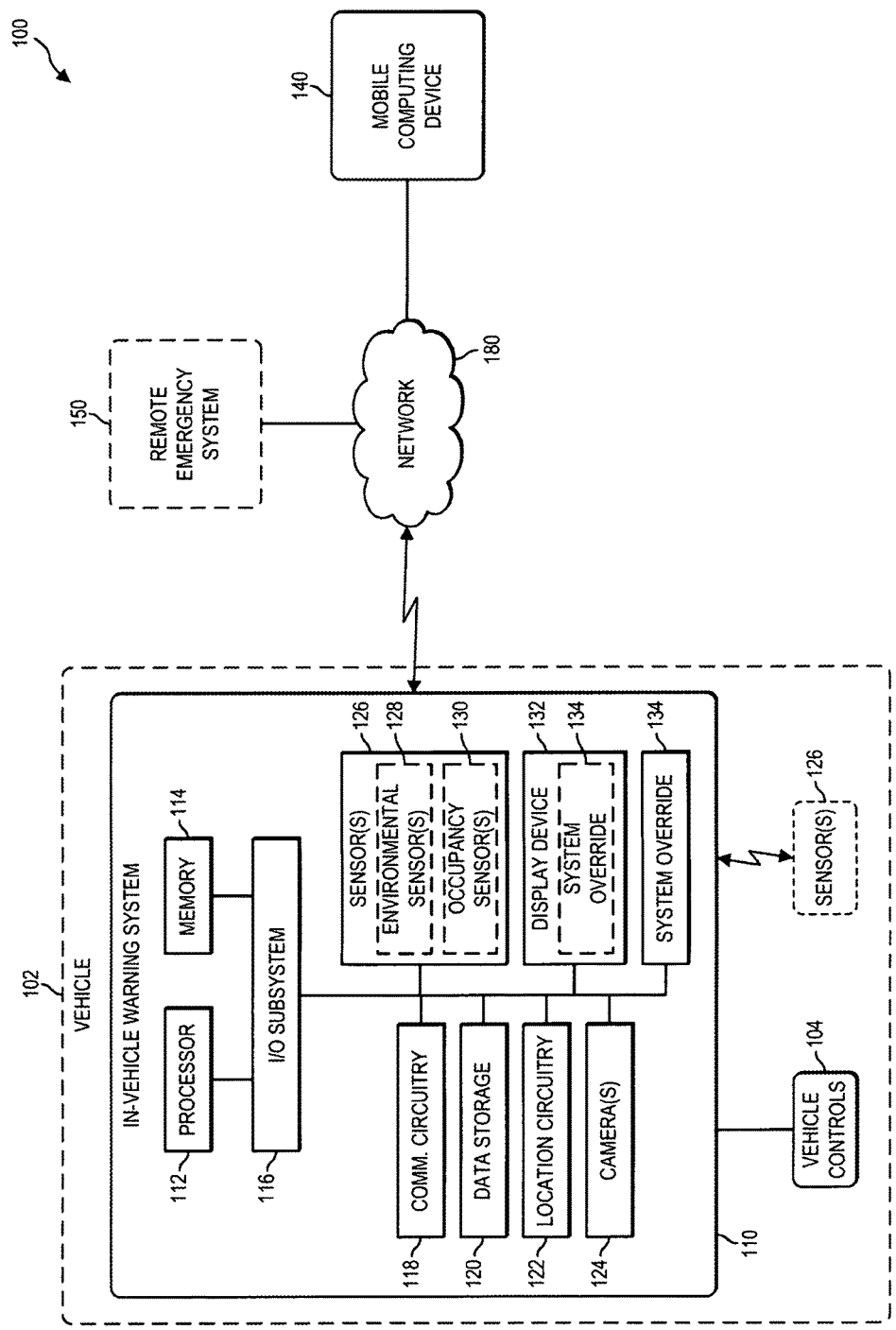
FIG. 1 is a simplified block diagram of at least one embodiment of a system for generating a warning based on environmental conditions sensed in a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for responding to environmental conditions sensed within a vehicle 102 includes an in-vehicle warning system 110. In use, the in-vehicle warning system 110 is configured to perform one or more emergency actions in response to determining that a non-operator occupant (e.g., a non-driver occupant) has been left inside the vehicle 102 and that one or more environmental conditions sensed within the vehicle 102 are unsafe. For example, the in-vehicle warning system 110 may determine that a child and/or pet has been left alone inside the vehicle 102 and the vehicle 102 has a cabin temperature that exceeds safe levels. To do so, the in-vehicle warning system 110 is configured to monitor the presence of an operator (e.g., a driver) within the vehicle 102. In response to determining that the operator is no longer present within the vehicle 102, the in-vehicle warning system 110 is configured to determine whether any non-operator occupants (e.g., children, pets, and/or other passengers) are present within the vehicle 102. If so, the in-vehicle warning system 110 determines whether one or more environmental conditions sensed within the vehicle 102 satisfy (e.g., meet or exceed) one or more reference condition thresholds. In some embodiments, the reference condition thresholds include one or more levels and/or criteria in which the environmental conditions sensed within the vehicle 102 are considered unsafe. If one or more of the environmental conditions sensed within the vehicle 102 are determined to be unsafe (e.g., the one or more environmental conditions satisfy the one or more reference condition thresholds), the in-vehicle warning system 110 is configured to perform or otherwise initiate one or more emergency actions. For example, in some embodiments, the in-vehicle warning system 110 is configured to alert the operator of the vehicle 102 (e.g., transmit a message to the operator's mobile computing device 140), alert emergency services (e.g., transmit a message to a remote emergency system 150), and/or control one or more components (e.g., engine ignition, horn, alarm device, windows, heater, air conditioning, door locks, etc.) of the vehicle 102 in response to determining that one or more environmental conditions within the vehicle 102 are unsafe.

The vehicle 102 may be embodied as any type of vehicle 102 capable transporting occupants including, but not limited to, an automobile, a tractor-trailer, a school bus, and/or any other type of vehicle. The vehicle 102 may include an interior cabin space within which one or more occupants may ride. The vehicle 102 may also include one or more vehicle controls 104, which are configured to control one or more components of the vehicle 102 including, but not limited to, an ignition system, a horn, an alarm device, one or more windows, a heating system, an air conditioning system, one or more door locks, and/or any other controllable component of the vehicle 102.

The in-vehicle warning system 110 may be embodied as, or otherwise include, any type of computing device capable of performing the functions described herein including, but not limited to, an in-vehicle computing system, a consumer electronic device, a mobile phone, a smart phone, a tablet computing device, a laptop computing device, a server, a personal digital assistant, and/or other type of computing device. As shown in FIG. 1, the illustrative in-vehicle warning system 110 includes a processor 112, a memory 114, an input/output (I/O) subsystem 116, communication circuitry 118, a data storage 120, location circuitry 122, one or more cameras 124, one or more sensors 126, a display device 132, and a system override 134. Of course, the in-vehicle warning system 110 may include other or additional components, such as those commonly found in a computer (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 112 in some embodiments.

The processor 112 may be embodied as any type of processor capable of performing the functions described herein. For example, the processor 112 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the in-vehicle warning system 110 such as operating systems, applications, programs, libraries, and drivers. The memory 114 is communicatively coupled to the processor 112 via the I/O subsystem 116, which may be embodied as circuitry and/or components to facilitate input/output operations with the processor 112, the memory 114, and other components of the in-vehicle warning system 110. For example, the I/O subsystem 116 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 116 may form a portion of a system-on-a-chip (SoC) and be incorporated, along with the processor 112, the memory 114, and other components of the in-vehicle warning system 110, on a single integrated circuit chip.

The communication circuitry 118 of the in-vehicle warning system 110 may be embodied as any type of communication circuit, device, or collection thereof, capable of enabling communications between the in-vehicle warning system 110, the mobile computing device 140, the remote emergency system 150, and/or other computing devices. The communication circuitry 118 may be configured to use any one or more communication technologies (e.g., wireless or wired communications) and associated protocols (e.g., Ethernet, Wi-Fi®, WiMAX, etc.) to effect such communication. In some embodiments the in-vehicle warning system 110, the mobile computing device 140, and the remote emergency system 150 communicate with each other over a network 180.

The network 180 may be embodied as any number of various wired and/or wireless communication networks. For example, the network 180 may be embodied as or otherwise include a local area network (LAN), a wide area network (WAN), a cellular network, or a publicly-accessible, global network such as the Internet. Additionally, the network 180 may include any number of additional devices to facilitate communication between the in-vehicle warning system 110, the mobile computing device 140, the remote emergency system 150, and/or the other computing devices.

The data storage 120 may be embodied as any type of device or devices configured for short-term or long-term storage of data such as, for example, memory devices and circuits, memory cards, hard disk drives, solid-state drives, or other data storage devices. Additionally, the location circuitry 122 of the in-vehicle warning system 110 may be configured as any type of device or devices configured to determine a current location (e.g., latitude, longitude, altitude, city, state, region, etc.) of the vehicle 102. For example, in some embodiments, the location circuitry 122 may include a global positioning system (GPS) device to determine the current location of the vehicle 102. It should be understood, however, the location circuitry 122 and/or the in-vehicle warning system 110 may include any number of other devices suitable for determining the current location of the vehicle 102.

Figure 2:
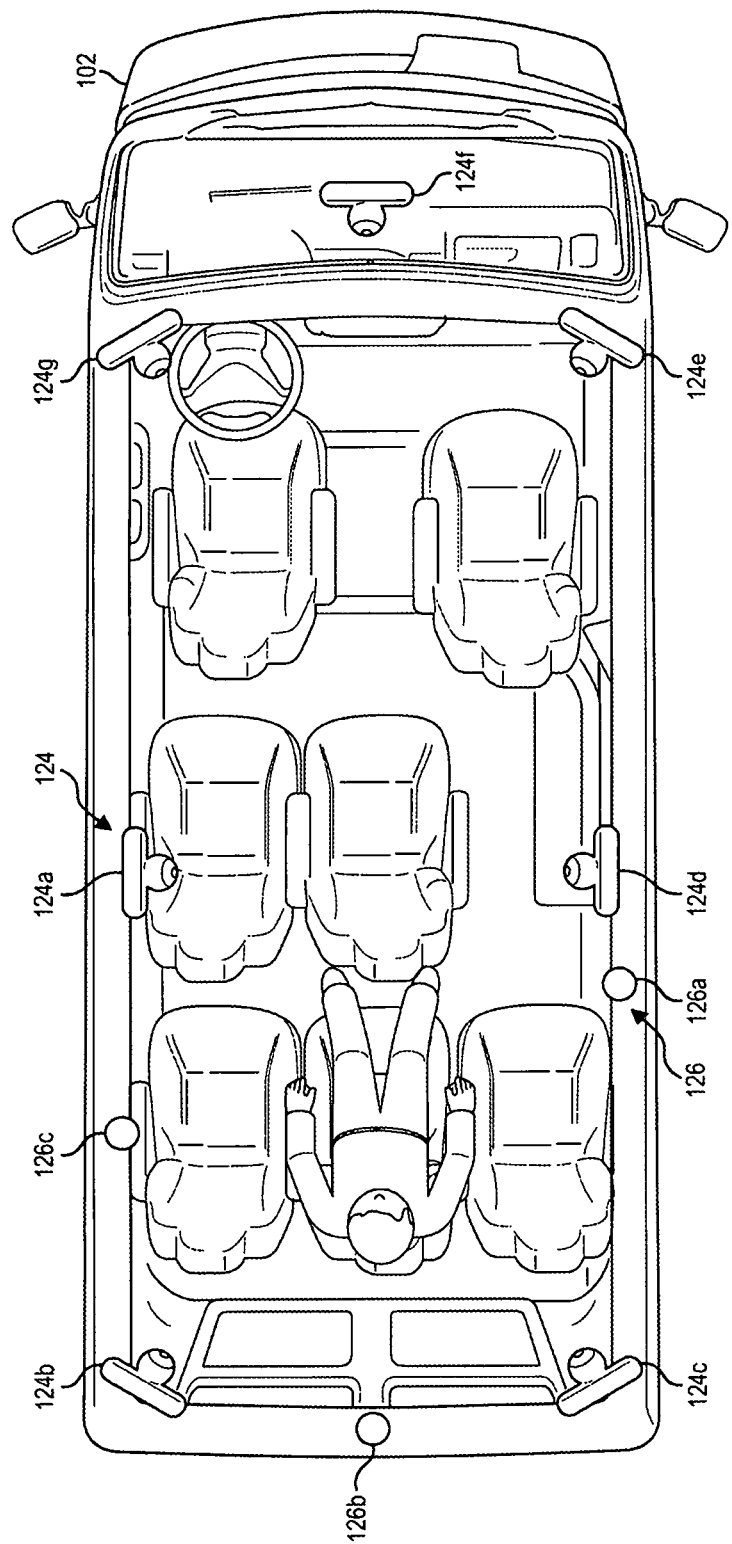
FIG. 2 is an illustrative embodiment of the vehicle of FIG. 1 including the in-vehicle warning system.

The one or more cameras 124 may be embodied as any type of camera, such as a digital camera (e.g., a digital point-and-shoot camera, a digital single-lens reflex (DSLR) camera, etc.), a video camera, or the like, that is capable of capturing images and/or video of the interior cabin space of the vehicle 102 and/or one or more occupants of the vehicle 102. In some embodiments, one or more of the cameras 124 may be embodied as a thermal imaging camera configured to capture images of infrared light sensed within the interior cabin space of the vehicle 102. Each of the one or more cameras 124 is positioned within the vehicle 102 such that the interior cabin space of the vehicle 102, or a portion thereof, is visible to the camera 124. For example, as illustratively shown in FIG. 2, multiple cameras 124 (e.g., cameras 124a-124g) are positioned within the vehicle 102 such that the majority of the interior cabin space of the vehicle 102 is covered by at least one camera 124. In some embodiments, one or more of the cameras 124 (e.g., the cameras 124a-124g) are embedded or otherwise attached onto an interior wall of the vehicle 102. Additionally or alternatively, one or more of the cameras 124 may be incorporated (e.g., embedded, integrated, etc.) or otherwise attached to an interior portion of the vehicle's 102 roof (e.g., a headliner, etc.), a posterior surface of a headrest of the vehicle 102, a dashboard of the vehicle 102, a console of the vehicle 102, and/or a rear-view mirror of the vehicle 102. The cameras 124 may also be integrated or otherwise incorporated within an in-vehicle interactive entertainment system and/or any other location within the vehicle 102 suitable for incorporating and/or attaching a camera thereto. Additionally or alternatively, in some embodiments, one or more of the cameras 124 may also be part of a camera array.

Additionally, it should be appreciated that although the one or more cameras 124 of the illustrative embodiment capture images and/or video of the interior cabin space of the vehicle 102, one or more of the cameras 124 may be embodied as one of the sensors 126. For example, in some embodiments, one or more of the cameras 124 may be embodied as a thermal imaging camera configured to capture infrared radiation information sensed within the vehicle 102 as discussed. In such embodiments, the in-vehicle warning system 110 may utilize the one or more cameras 124 as a sensor 126. In doing so, the in-vehicle warning system 110 may use data, images, and/or video captured by the one or more cameras 124 to determine the occupancy of the vehicle 102 and/or the environmental conditions within the vehicle 102. Of course, in some embodiments, one or more of the cameras 124 may serve multiple purposes (e.g., the generated images may be used to sense occupants of the vehicle 102 and to sense characteristics of the occupant and/or environment of the interior cabin space of the vehicle 102).

Referring back to FIG. 1, the one or more sensors 126 may be embodied as any type of device or devices configured to sense characteristics of an occupant within the vehicle 102 and/or an environmental condition within the vehicle 102. For example, in some embodiments, one or more of the sensors 126 may be embodied as one or more environmental sensors 128 configured to sense (e.g., capture) environmental conditions within the interior cabin of the vehicle 102. In such embodiments, the one or more environmental sensors 128 may include, for example, a temperature sensor configured to sense the temperature within the vehicle 102 and/or an air quality sensor configured to sense a level or percentage of carbon monoxide (CO) and/or a level or percentage of carbon dioxide ($CO_2$) within the vehicle 102. It should be appreciated that the in-vehicle warning system 110 may include any other type of environmental sensor 128 for sensing other environmental conditions within the vehicle 102. In some embodiments, the environmental conditions captured by the one or more environmental sensors 128 may be embodied as environmental condition data, which as discussed in more detail below, may be used by the in-vehicle warning system 110 to determine whether one or more environmental conditions inside of the vehicle 102 satisfy one or more reference condition thresholds.

Additionally, in some embodiments, one or more of the sensors 126 may be embodied as one or more occupancy sensors 130 configured to sense (e.g., capture) characteristics of an occupant of the vehicle 102. For example, in some embodiments, one or more of the occupancy sensors 130 may be embodied as, or otherwise include, one or more biometric sensors configured to sense physical attributes (e.g., facial features, speech patterns, retinal patterns, fingerprints, etc.) and/or behavioral characteristics (e.g., eye movement, visual focus, body movement, key input force, key input speed, etc.) of an occupant of the vehicle 102. Additionally or alternatively, one or more of the occupancy sensors 130 may be embodied as, or otherwise include, one or more proximity detection sensors configured to sense the proximity of an occupant of the vehicle 102 or a physical token (e.g., a radio-frequency identification tag, a near field communication tag, a radio frequency transmitter, an electronic identification device, a wearable device, a medical sensor with identification information, etc.) carried and/or worn by an occupant of the vehicle 102. In some embodiments, one or more of the occupancy sensors 130 may be embodied as a motion sensor, a breathing detection sensor, a heart rate sensor, and/or a microphone. As discussed below, the occupant characteristics sensed by the one or more occupancy sensors 130 may be used by the in-vehicle warning system 110 to detect whether one or more occupants are present within the vehicle 102, determine the identity of one or more occupants detected within the vehicle 102, and/or determine the location of one or more of occupants detected within the vehicle 102.

Each of the sensors 126 is positioned within the vehicle 102 such that the environmental conditions and/or occupants within the vehicle 102 can be sensed. For example, as illustratively shown in FIG. 2, multiple sensors 126 (e.g., sensors 126a-126c) are positioned within the vehicle 102. In some embodiments, one or more of the sensors 126 (e.g., the sensors 126a-126c) are embedded or otherwise attached onto an interior wall of the vehicle 102. Additionally or alternatively, one or more of the sensors 126 may be incorporated (e.g., embedded, integrated, etc.) or otherwise attached to an interior portion of the vehicle's 102 roof (e.g., a headliner, etc.), a posterior surface of a headrest of the vehicle 102, a dashboard of the vehicle 102, a console of the vehicle 102, and/or a rear-view mirror of the vehicle 102. The sensors 126 may also be integrated or otherwise incorporated within an in-vehicle interactive entertainment system and/or any other location within the vehicle 102 suitable for incorporating and/or attaching a sensor thereto.

Referring back to FIG. 1, the display device 132 may be embodied as any type of display device capable of performing the functions described herein. For example, the display device 132 may be embodied as any type of display device capable of displaying information to occupants (e.g., operator occupants, non-operator occupants, etc.) of the vehicle 102 including, but not limited to, an in-vehicle information console (e.g., an in-dash touchscreen display device), a smart display device, a monitor, a television, a mobile phone, a smart phone, a tablet computing device, a personal digital assistant, a consumer electronic device, a laptop computer, a server, and/or any other type of display device. As such, the display device 132 may include, or otherwise use, any suitable display technology including, for example, a liquid crystal display (LCD), a light emitting diode (LED) display, a cathode ray tube (CRT) display, a plasma display, and/or other display usable in an in-vehicle warning system 110 to display information to occupants of the vehicle 102.

The system override 134 may be configured to enable an occupant of the vehicle 102 to override and/or prevent one or more of the emergency response actions from being performed. For example, in some embodiments, an adult occupant of the vehicle 102 may activate the system override 134 to prevent an emergency response from being performed in response to an environmental condition (e.g., the temperature) within the vehicle 102 satisfying a reference temperature threshold. In some embodiments, the system override 134 may be embodied as one or more physical push-button or toggle switches with which the occupant may interact. Additionally or alternatively, the system override 134 may be embodied as one or more "soft" switches, capacitive or resistive switches, other electrical-type switches, non-mechanical switches, or other buttons, switches, or other appropriate circuitry usable by an occupant of the vehicle 102 to prevent an emergency response from being performed. For example, in some embodiments, the display device 132 may be embodied as a touchscreen display device configured to provide the occupant with a selectable option for activating the system override 134.

The mobile computing device 140 may be embodied as any type of computing device capable of performing the functions described herein including, but not limited to, a mobile phone, a smart phone, a tablet computing device, a personal digital assistant, a consumer electronic device, a laptop computer, a wearable computing device, and/or other type of computing device. As such, the mobile computing device 140 may include devices and structures commonly found in computing devices such as processors, memory devices, communication circuitry, and data storages, which are not shown in FIG. 1 for clarity of the description. In some embodiments, the mobile computing device 140 receives a message from the in-vehicle warning system 110 alerting the operator of the presence of a non-operator occupant (e.g., a child, pet, dependent, and/or other non-operator occupants) within the vehicle 102 and one or more unsafe environmental conditions sensed within the vehicle 102. In response to receiving such message, the mobile computing device 140 may perform one or more actions such as, for example, generating a visual or audible alert to the user of the mobile computing device 140.

The remote emergency system 150 may be embodied as any type of server or similar computing device(s) capable of performing the functions described herein. As such, the remote emergency system 150 may include devices and structures commonly found in servers such as processors, memory devices, communication circuitry, and data storages, which are not shown in FIG. 1 for clarity of the description. In some embodiments, the remote emergency system 150 is configured to receive a message from the in-vehicle warning system 110 alerting emergency services personnel of the presence of a non-operator occupant (e.g., a child, pet, dependent, and/or other non-operator occupants) within the vehicle 102 and one or more unsafe environmental conditions sensed within the vehicle 102. Similar to the mobile computing device 140, the remote emergency system 150 may perform one or more actions in response to receiving the message from the in-vehicle warning system 110 such as, for example, notifying emergency personnel and/or the mobile computing device 140.

Figure 3:
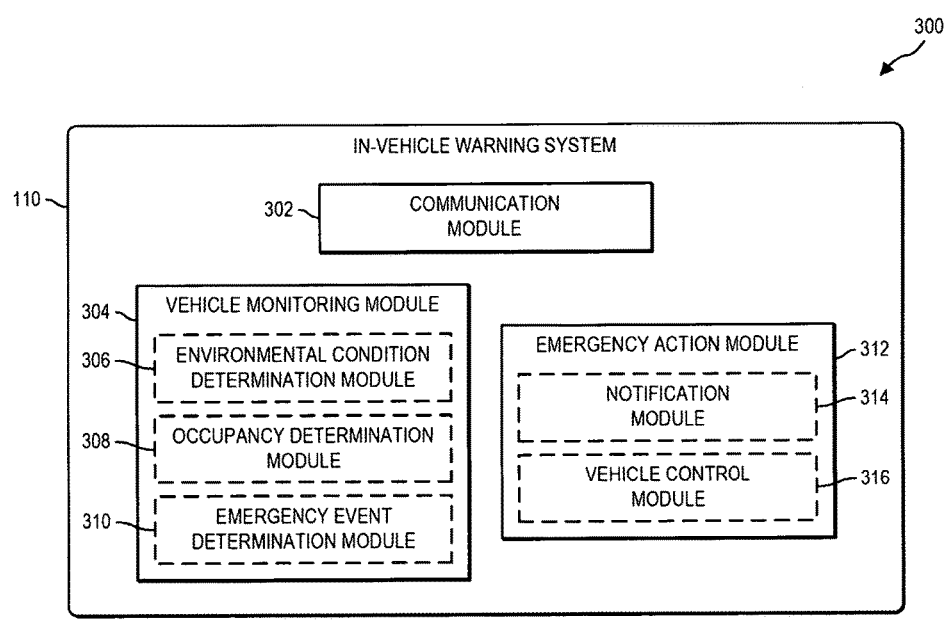
FIG. 3 is a simplified block diagram of at least one embodiment of an environment of the in-vehicle warning system of FIG. 1.

Referring now to FIG. 3, in use, the in-vehicle warning system 110 establishes an environment 300 during operation. The illustrative environment 300 includes a communication module 302, a vehicle monitoring module 304, and an emergency action module 312. In some embodiments, the vehicle monitoring module 304 illustratively includes an environmental condition determination module 306, an occupancy determination module 308, and an emergency event determination module 310. Additionally, as discussed in more detail below, the emergency action module 312 may include a notification module 314 and a vehicle control module 316. Each of the modules 302, 304, 306, 308, 310, 312, 314, and 316 of the environment 300 may be embodied as hardware, software, firmware, or a combination thereof. It should be appreciated that the in-vehicle warning system 110 may include other components, sub-components, modules, and devices commonly found in a computing and/or warning device, which are not illustrated in FIG. 3 for clarity of the description.

The communication module 302 of the in-vehicle warning system 110 facilitates communications between components or sub-components of the in-vehicle warning system 110 and the in-vehicle warning system 110, the mobile computing device 140, and/or the remote emergency system 150. For example, in some embodiments, the in-vehicle warning system 110 may send (e.g., transmit) a message to the mobile computing device 140 and/or the remote emergency system 150 alerting an operator (e.g., a driver) of the vehicle 102 and/or third-party emergency services that a non-driver occupant (e.g., a child, pet, dependent, etc.) is present within the vehicle 102 and that one or more environmental conditions within the vehicle 102 have reached a dangerous level.

The vehicle monitoring module 304 is configured to monitor the environmental conditions within the vehicle 102. To do so, in some embodiments, the vehicle monitoring module 304 includes the environmental condition determination module 306. In such embodiments, the environmental condition determination module 306 is configured to receive cabin data indicative of one or more environmental conditions sensed within the vehicle 102. For example, the environmental condition determination module 306 may be configured to receive environmental condition data (e.g., temperature data, air quality data, etc.) captured by one or more environmental sensors 128 positioned within the vehicle 102. In some embodiments, the environmental condition determination module 306 is configured to process the environmental condition data received from the one or more environmental sensors 128. For example, in some embodiments, the environmental condition determination module 306 is configured to format the environmental condition data and/or the convert environmental condition data from one unit of measure to another unit of measure (e.g., convert temperature scales, calculate percentages of concentration, etc.).

The vehicle monitoring module 304 is also configured to determine the occupancy of the vehicle 102. To do so, the vehicle monitoring module 304 may include the occupancy determination module 308. In some embodiments, the occupancy determination module 308 is configured to receive an image of the vehicle's 102 interior cabin space captured by the one or more cameras 124. In addition to the actual image of the interior cabin space of the vehicle, the image captured by the one or more cameras 124 may include other types of information (e.g., Exif metadata, visible light information, image depth information, etc.) regarding the image itself and/or settings used by the one or more cameras 124 to capture the image. Additionally or alternatively, the occupancy determination module 308 is configured to receive cabin data indicative of the presence of one or more occupants (e.g., a vehicle operator occupant, a non-operator occupant, a pet, etc.) within the vehicle 102. For example, the occupancy determination module 308 may be configured to receive occupancy data (e.g., occupant detection data, occupant location data, occupant movement data, occupant vital sign data, occupant activity data, biometric data, etc.) captured by one or more occupancy sensors 130 positioned within the vehicle 102. Based on the interior cabin image captured by the one or more cameras 124 and/or the occupancy data captured by the one or more occupancy sensors 130, the occupancy determination module 308 is configured to detect the presence of one or more occupants (e.g., an operator, one or more non-operator occupants, a pet, etc.) within the vehicle 102.

In some embodiments, the occupancy determination module 308 is also configured to determine whether an occupant detected within the vehicle 102 is the operator of the vehicle 102 or a non-operator occupant (e.g., a child, dependent, pet, etc.). To do so, the occupancy determination module 308 may determine the location of the occupant or occupants detected within the vehicle 102. For example, in some embodiments, the occupancy determination module 308 may determine that a particular occupant detected within the vehicle 102 is the operator in response to determining that the occupant is located in an operator seat (e.g., the driver seat) of the vehicle 102. To do so, the occupancy determination module 308 may perform an image analysis procedure (e.g., an object detection algorithm, a feature detection algorithm, a facial recognition algorithm, etc.) on an image received from the one or more cameras 124 positioned inside of the vehicle 102. In some embodiments, the occupancy determination module 308 may compare the image of the interior cabin space of the vehicle 102 to a baseline image and/or a geometric digital model (e.g., a three-dimensional model, a two-dimensional model, a computer-aided design drawing, etc.) of the interior cabin space of the vehicle 102. In such embodiments, the occupancy determination module 308 may identify background objects depicted or otherwise present within the baseline image and/or geometric digital model (e.g., vehicle seats, a vehicle steering wheel, vehicle controls, and/or other vehicle components or stationary object within the vehicle 102). The occupancy determination module 308 may subtract those identified objects from the image of the vehicle's 102 interior cabin space captured by the one or more cameras 124. The occupancy determination module 308 may thereafter determine whether the remaining objects within the captured image are indicative of an occupant (e.g., a child, dependent, pet, etc.) present within the vehicle 102.

Additionally or alternatively, the occupancy determination module 308 use data received from the one or more sensors 126 (e.g., the occupancy sensors 130) to identify and/or differentiate one or more occupants detected within the vehicle. For example, in some embodiments, the occupancy determination module 308 may analyze biometric data received from one of the occupancy sensors 130 (e.g., a biometric sensor) to ascertain the identity of one or more occupants sensed within the vehicle 102. Additionally or alternatively, in some embodiments, the occupancy determination module 308 may receive sound data captured by a sound sensor 126 (e.g., a microphone) positioned within the vehicle 102. In such embodiments, the occupancy determination module 308 may be configured to analyze the sound data to distinguish noises made by occupants of the vehicle 102 (e.g., voices, crying, barking, etc.) from ambient noise inside of the vehicle 102. It should be appreciated that the occupancy determination module 308 may use any suitable technology or procedure for detecting the presence of an occupant within the vehicle 102, determining the location of a detected occupant within the vehicle 102, and/or identifying one or more occupants detected within the vehicle 102.

The vehicle monitoring module 304 is further configured to determine the presence and/or and occurrence of an emergency event. To do so, in some embodiments, the vehicle monitoring module 304 includes the emergency event determination module 310. In such embodiments, the emergency event determination module 310 is configured to determine the presence of an emergency event based at least in part on, or otherwise as a function of, determining that a non-driver occupant has been left alone inside of the vehicle 102 and that one or more environmental conditions sensed within the vehicle 102 satisfy (e.g., meet, exceed, fall below, etc.) a reference condition threshold. In some embodiments, the reference condition thresholds include one or more levels and/or criteria in which the environmental conditions sensed within the vehicle 102 are considered unsafe. For example, in some embodiments, one or more reference condition thresholds may define a maximum and/or a minimum ambient temperature permitted within the vehicle 102. In another example, one or more reference condition thresholds may define a minimum air quality rating within the vehicle 102 and/or a maximum level of carbon monoxide (CO) and/or carbon dioxide ($CO_2$) permitted within the vehicle 102.

Additionally or alternatively, one or more of the reference condition thresholds may also define other criteria used by the emergency event determination module 310 to determine the presence of an emergency event. For example, in some embodiments, the vital signs (e.g., heart rate, blood pressure, blood oxygen level, breathing pattern, etc.) of one or more occupants within the vehicle 102 may be monitored by one or more wearable sensors 126. In such embodiments, one or more of the reference condition thresholds may define minimum and/or maximum vital signs permitted. Additionally or alternatively, one or more of the reference condition thresholds may specify that an emergency event is present only if an operator of the vehicle 102 is no longer present. It should be appreciated that any criteria and/or reference threshold may be used by the emergency event determination module 310 to determine the presence of an emergency event within the vehicle 102. It should also be appreciated that although the emergency event determination module 310 determines the presence of an emergency event based at least in part on reference condition thresholds in the illustrative embodiment, the emergency event determination module 310 may additionally or alternatively be configured to utilize other techniques to determine the presence of an emergency event in other embodiments. For example, in some embodiments, the emergency event determination module 310 may be configured to utilize one or more artificial intelligence-based techniques (e.g., search algorithms, mathematical optimization, and/or evolutionary computations; logic programming and/or automated reasoning; probabilistic algorithms; statistical-based learning methods; Bayesian networks; trained and/or boosted classifiers; machine learning; artificial neural networks; and/or any other artificial intelligence-based technique) to actively detect anomalous or dangerous conditions within the vehicle 102.

The emergency action module 312 is configured to initiate or otherwise perform one or more emergency actions in response to the vehicle monitoring module 304 (e.g., via the emergency event determination module 310) determining the presence of an emergency event within the vehicle 102. For example, in some embodiments, emergency action module 312 is configured to alert or otherwise notify the operator of the vehicle 102, third-party emergency services, a passerby, or another party of the presence of an emergency event.

To do so, the emergency action module 312 may include the notification module 314. The notification module 314 is configured to generate and transmit a message alerting or otherwise notifying the operator of the vehicle 102, third-party emergency services, and/or another party of the emergency event. For example, in some embodiments, the notification module 314 is configured to transmit a message to the mobile computing device 140 of the operator alerting of the emergency event (e.g., the unsafe conditions within the vehicle 102 and the presence of a non-operator occupant). Additionally or alternatively, the notification module 314 is configured to transmit the message to the remote emergency system 150 operated by the third-party emergency services. In either case, the message may be embodied as a text message and/or any other type of message (e.g., an email, an application message, a video message, a phone call, etc.) notifying and/or alerting the operator of vehicle 102 and/or the third-party emergency services of the emergency event. In some embodiments, the message transmitted by the notification module 314 may include information indicative of the emergency event. For example, the message may include a description of the emergency event, one or more environmental conditions sensed within the vehicle 102, the location of the vehicle 102, and/or any other information to facilitate the operator of the vehicle and/or third-party emergency services personnel in locating the vehicle and/or responding to the emergency event. Additionally or alternatively, in some embodiments, the notification module 314 may also be configured to transmit live streaming video and/or an image captured by the one or more cameras 124 for verification by the operator of the vehicle 102 and/or the third-party emergency services personnel. In embodiments wherein an image captured by the one or more cameras 124 is transmitted for verification, the image may be annotated to facilitate verifying occupants detected within the vehicle 102.

The emergency action module 312 is also configured to control one or more components of the vehicle 102. For example, the emergency action module 312 may be configured to control one or more of the vehicle's 102 ignition system, horn, alarm devices, windows, heating system, air conditioning system, door locks, and/or any other controllable component of the vehicle 102. To do so, the emergency action module 312 may include the vehicle control module 316. The vehicle control module 316 is configured to control one or more components of the vehicle 102 in response to the presence of an emergency event. For example, in some embodiments, the vehicle control module 316 may control the interior cabin temperature (e.g., turn the vehicle 102 on or off, increase or decrease the temperature inside of the vehicle 102, and/or open one or more windows of the vehicle 102) in response to determining that the interior cabin temperature satisfies one or more reference condition thresholds defining unacceptable temperatures within the vehicle 102. That is, the vehicle control module 316 may control the interior cabin temperature in response to determining the presence of an emergency event relating to the interior cabin temperature of the vehicle 102. Additionally or alternatively, the vehicle control module 316 may control one or more components of the vehicle 102 to alert a passerby of the emergency event. For example, in some embodiments, the vehicle control module 316 may activate the vehicle's 102 horn, flash one or more lights of the vehicle 102, control a door lock of the vehicle 102, and/or active the vehicle's 102 alarm system in response to determining the presence of an emergency event relating to the interior cabin temperature of the vehicle 102. It should be appreciated that although the illustrative vehicle control module 316 controls components of the vehicle 102 in response to the presence of an emergency event relating to the interior cabin temperature of the vehicle 102, the vehicle control module 316 may control one or more components of the vehicle 102 in response to the presence of an emergency event relating to any other unsafe environmental condition and/or in response to one or more reference condition thresholds being satisfied.

Figure 4A:
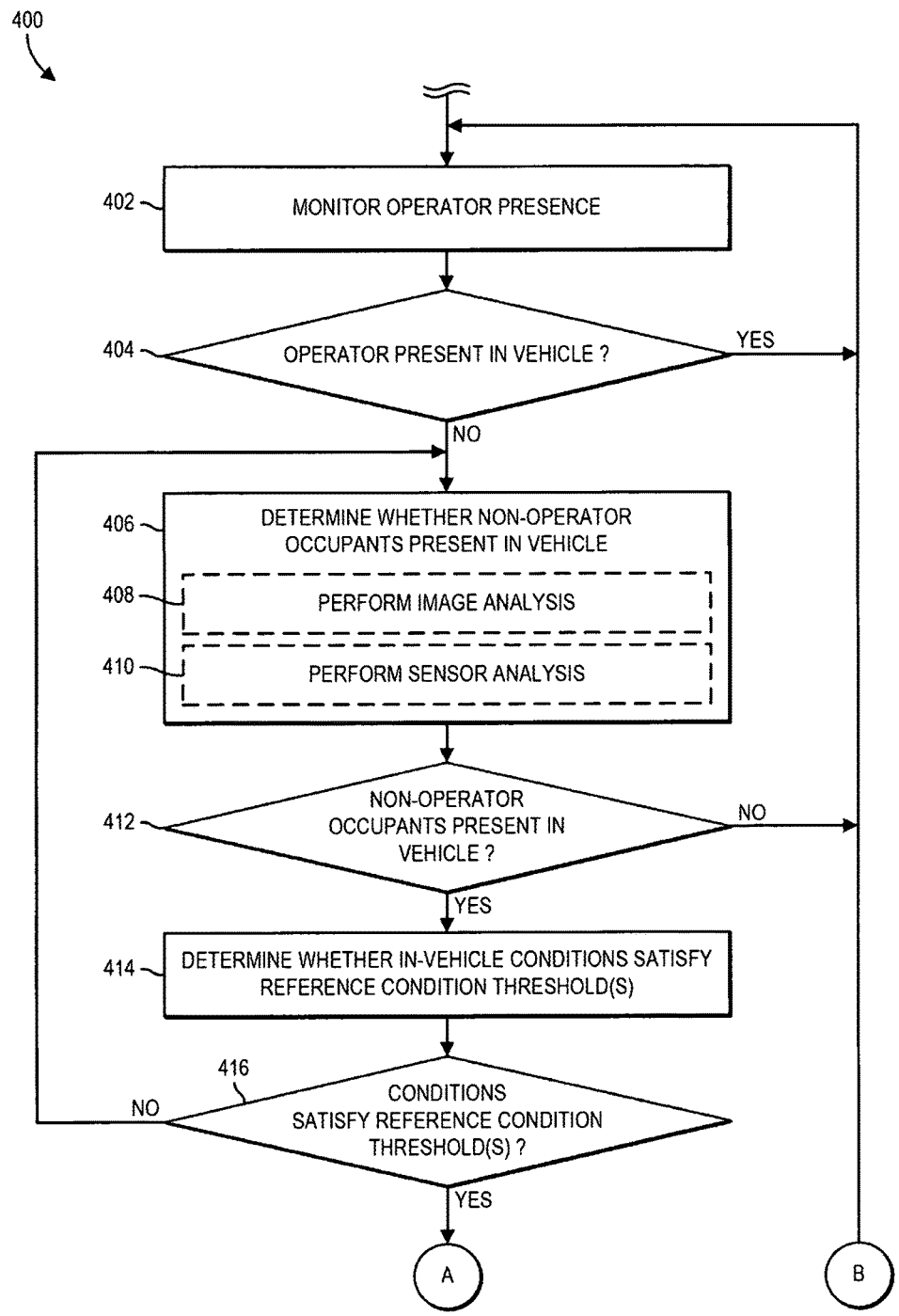
FIGS. 4A-4B is a simplified flow diagram of at least one embodiment of a method that may be executed by the in-vehicle warning system of FIGS. 1 and 3 for generating a warning based on environmental conditions sensed in a vehicle.
Figure 4B:
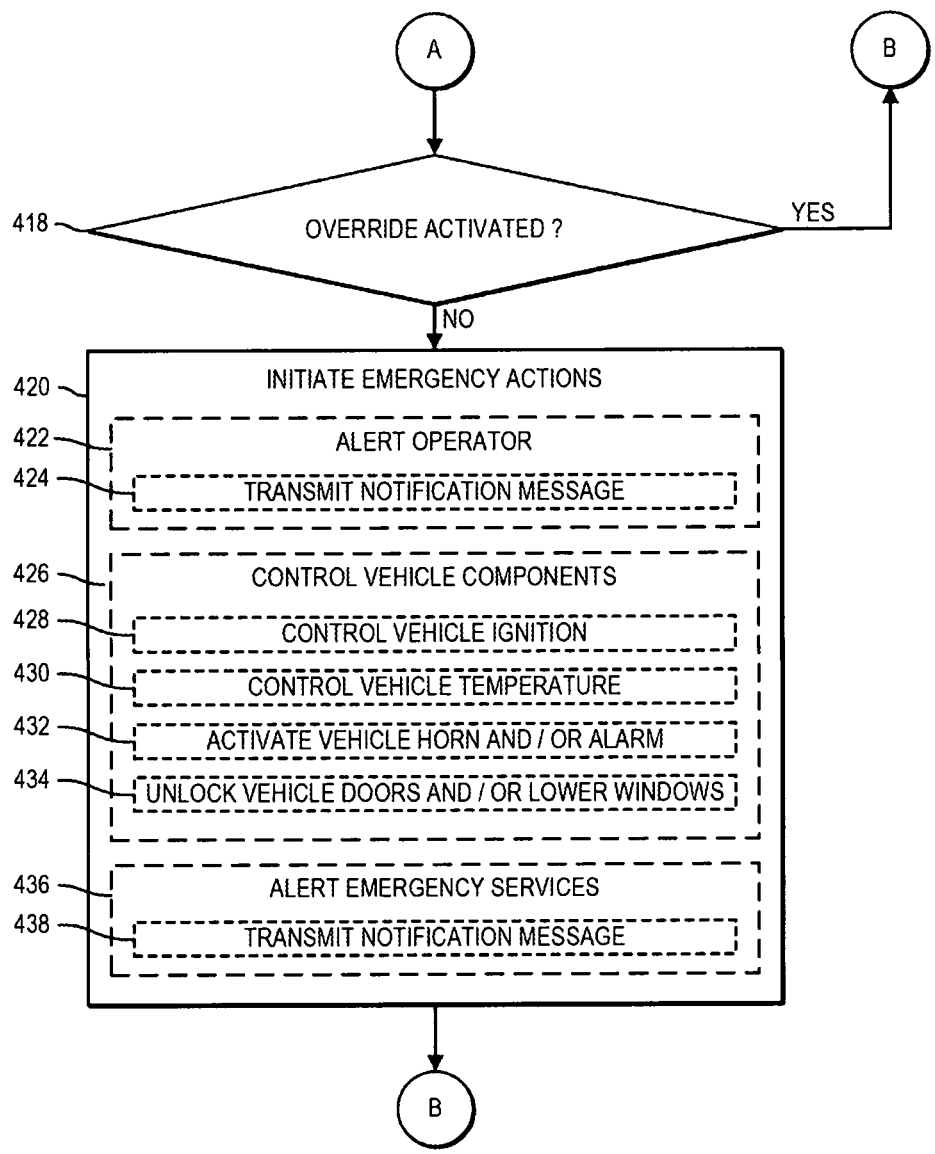

Referring now to FIGS. 4A-4B, the in-vehicle warning system 110 may execute a method 400 for generating a warning based on environmental conditions sensed in the vehicle 102. The method 400 begins with block 402 in which the in-vehicle warning system 110 monitors the presence of the operator (e.g., the vehicle's driver) within the vehicle 102. To do so, in some embodiments, the in-vehicle warning system 110 receives one or more images of the vehicle's 102 interior cabin space captured by one or more of the cameras 124. In such embodiments, the in-vehicle warning system 110 may compare the one or more captured images of the interior cabin space of the vehicle 102 to one or more baseline images and/or geometric models of the interior cabin space of the vehicle 102. The one or more baseline images may be embodied as one or more images of the interior cabin space of the vehicle 102 previously captured by one or more of the cameras 124. Based on the comparison, the in-vehicle warning system 110 detects the presence of one or more occupants inside of the vehicle 102. In some embodiments, the in-vehicle warning system 110 may determine whether the detected occupant is located in an operator seat (e.g., a driver seat) or another seat of the vehicle 102. In such embodiments, the in-vehicle warning system 110 may determine that the operator of the vehicle 102 is present in response to determining that an occupant detected within the vehicle 102 is located in the operator's seat. Additionally or alternatively, in some embodiments, the in-vehicle warning system 110 may monitor the presence of the operator within the vehicle via cabin data (e.g., occupancy data) sensed by one or more of the sensors 126 (e.g., the occupancy sensors 130, such as an occupancy sensor 130 embedded in the vehicle operator's seat).

In block 404, the in-vehicle warning system 110 determines whether the operator is present within the vehicle 102. As discussed, the in-vehicle warning system 110 may determine that the operator is present within the vehicle 102 based at least in part on, or otherwise as a function of, occupancy data received from the sensors 126 (e.g., the occupancy sensors 130) and/or comparing one or more images of the interior cabin space captured by one or more of the cameras 124 to a baseline image and/or a digital geometrical model of the interior cabin space. If, in block 404, the in-vehicle warning system 110 determines that the operator is present in the vehicle 102, the method 400 returns to block 402 to continue monitoring the operator's presence within the vehicle 102. If, however, the in-vehicle warning system 110 instead determines that the driver is not present within the vehicle 102, the method 400 advances to block 406.

In block 406, the in-vehicle warning system 110 determines whether a non-operator occupant (e.g., a child, a pet, a dependent, etc.) is present in the vehicle 102. To do so, in block 408, the in-vehicle warning system 110 may perform an image analysis procedure (e.g., an object detection algorithm, a feature detection algorithm, etc.) on one or more images of the vehicle's interior cabin captured by the cameras 124. For example, in some embodiments, the in-vehicle warning system 110 may execute the method 500 illustratively shown in FIG. 5 and discussed in more detail below. Additionally or alternatively, in block 410, the in-vehicle warning system 110 may also analyze the cabin data received from the sensors 126 (e.g., the occupancy sensors 130) to determine whether a non-operator occupant is present in the vehicle 102. For example, the in-vehicle warning system 110 may receive occupancy data (e.g., occupant detection data, occupant location data, occupant movement data, occupant vitals data, occupant activity data, biometric data, etc.) captured by one or more occupancy sensors 130 positioned within the vehicle 102. It should be appreciated that in some embodiments, the occupancy data received by the in-vehicle warning system 110 may be embodied as occupancy data received from the one or more cameras 124 and/or the one or more environmental sensors 128 positioned within the vehicle 102. For example, in-vehicle warning system 110 may receive occupancy data embodied as one or more images of an occupant's breathing pattern captured by the one or more cameras 124. In another example, in-vehicle warning system 110 may receive occupancy data indicative of an increased level of carbon dioxide ($CO_2$) sensed within the vehicle 102. The method 400 then advances to decision block 412. If, in decision block 412, the in-vehicle warning system 110 determines that a non-operator occupant is present in the vehicle 102, the method 400 advances to block 414. If, however, the in-vehicle warning system 110 instead determines in decision block 412 that a non-operator occupant is not present in the vehicle 102, the method 400 returns to block 402 to continue monitoring the presence of the operator.

In block 414, the in-vehicle warning system 110 determines whether one or more environmental conditions sensed within the vehicle 102 satisfy a reference condition threshold. To do so, the in-vehicle warning system 110 compares environmental condition data received from one or more of the sensors 126 (e.g., the environmental sensors 128 and/or the one or more cameras 124) to one or more reference condition thresholds. As discussed, the reference condition thresholds may include one or more levels and/or criteria in which the environmental conditions sensed within the vehicle 102 are considered unsafe. The method 400 then advances to decision block 416. If, in decision block 416, the in-vehicle warning system 110 determines that one or more environmental conditions sensed within the vehicle 102 satisfy a reference condition threshold, the method 400 advances to block 418 (see FIG. 4B). If, however, the in-vehicle warning system 110 instead determines in decision block 416 that the environmental conditions sensed within the vehicle 102 do not satisfy a reference condition threshold, the method 400 loops back to block 406 in which the in-vehicle warning system 110 determines whether a non-operator occupant is still present within the vehicle 102.

In block 418 of FIG. 4B, the in-vehicle warning system 110 determines whether a system override is activated (e.g., enabled). To do so, the in-vehicle warning system 110 may determine whether one or more occupants of the vehicle 102 activated the system override 134. For example, in some embodiments, the system override 134 may be embodied as one or more physical push-button switches, which when interacted with by an occupant of the vehicle 102, generate one or more signals indicative of the occupant activating the system override 134. Additionally or alternatively, the system override 134 may be embodied as a selectable option displayed on a touchscreen device within the vehicle 102, which when selected by an occupant of the vehicle 102, generates one or more signals indicative of the occupant activating the system override 134. If, in block 418, the in-vehicle warning system 110 determines the system override 134 is activated (e.g., enabled), the method 400 returns to block 402 to continue monitoring the presence of the operator. If, however, the in-vehicle warning system 110 instead determines in block 418 that the system override 134 is not activated (e.g., disabled), the method 400 advances to block 420. In some embodiments, the in-vehicle warning system 110 may be configured to override or otherwise ignore the activation of the system override 134 in response to, for example, the in-vehicle warning system 110 determining that certain environmental conditions sensed within the vehicle 102 pose a danger to the occupants (e.g., that the level of carbon dioxide in the vehicle 102 is greater than a safe level).

In block 420, the in-vehicle warning system 110 initiates one or more emergency actions. In some embodiments, in block 422, the in-vehicle warning system 110 alerts the operator of the vehicle 102 of the presence of an emergency event and/or in response to one or more reference condition thresholds being satisfied. For example, in block 424, the in-vehicle warning system 110 may transmit a message to the operator's mobile computing device 140 alerting or otherwise notifying the operator of the presence of the emergency event and/or the presence of a non-operator occupant inside of the vehicle 102. In some embodiments the message may be embodied as a text message and/or any other type of message (e.g., an email, an application message, a video message, a phone call, etc.) notifying and/or alerting the operator of vehicle 102 of the emergency event. The message may include information indicative of the emergency event (e.g., a description of the emergency event, one or more environmental conditions sensed within the vehicle 102, the location of the vehicle 102, live streaming video, and/or one or more images of the interior cabin space captured by the one or more cameras 124, etc.).

Additionally or alternatively, in block 426, the in-vehicle warning system 110 controls one or more components of the vehicle 102 in response to the emergency event and/or one or more reference condition thresholds being satisfied. For example, in blocks 428-434, the in-vehicle warning system 110 may control one or more of the vehicle's 102 ignition system (e.g., block 428), control the interior cabin temperature of the vehicle 102 (e.g., block 430), activate the horn and/or alarm system of the vehicle 102 (e.g., block 432), and/or unlock one or more doors and/or lower one or more windows of the vehicle 102 (e.g., block 434) in response to the presence of an emergency event (e.g., unsafe environmental conditions sensed within the vehicle 102, etc.). Of course, as discussed above, the in-vehicle warning system 110 may control additional or other vehicle components in other embodiments.

In some embodiments, in block 436, the in-vehicle warning system 110 may also alert third-party emergency services of the presence of the emergency event and/or in response to one or more reference condition thresholds being satisfied. For example, in block 438, the in-vehicle warning system 110 may transmit a message to a remote emergency system 150 operated by the third-party emergency services alerting or otherwise notifying emergency services personnel of the presence of the emergency event and/or the presence of a non-operator occupant inside of the vehicle 102. In some embodiments the message may be embodied as any type of message (e.g., a phone call, an email, an application message, a video message, a text message, etc.) notifying and/or alerting the third-party emergency services of the emergency event. The message may include information indicative of the emergency event (e.g., a description of the emergency event, one or more environmental conditions sensed within the vehicle 102, the location of the vehicle 102, live streaming video, and/or one or more images of the interior cabin space captured by the one or more cameras 124, etc.).

Figure 5:
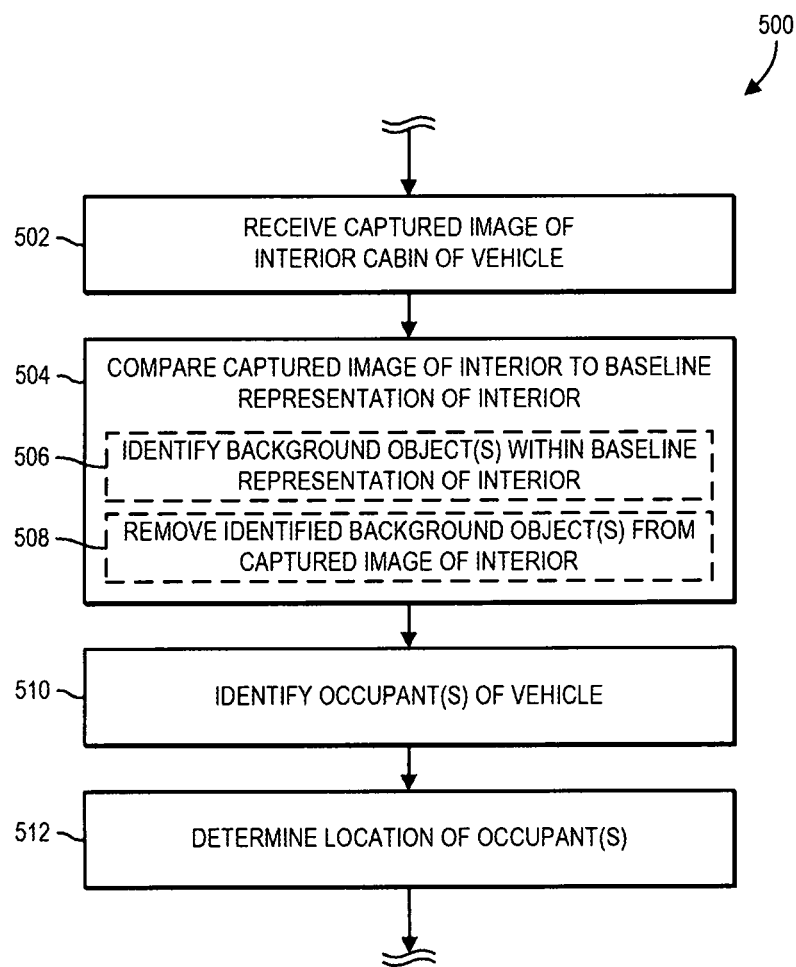
FIG. 5 is a simplified flow diagram of at least one embodiment of a method that may be executed by the in-vehicle warning system of FIGS. 1 and 3 for monitoring the presence of an operator within the vehicle and determining whether a non-operator occupant is present within the vehicle.

Referring now to FIG. 5, the in-vehicle warning system 110 may execute a method 500 for monitoring the presence of an operator within the vehicle 102 and/or determining whether a non-operator occupant is present within the vehicle 102. The method 500 begins with block 502 in which the in-vehicle warning system 110 receives one or more images of the interior cabin space of the vehicle 102 captured by the one or more cameras 124 positioned within the vehicle 102.

In block 504, the in-vehicle warning system 110 compares the one or more images of the interior cabin space of the vehicle 102 to one or more baseline images and/or geometric digital models (e.g., a three-dimensional model, a two-dimensional model, a computer-aided design drawing, etc.) of the interior cabin space of the vehicle 102. To do so, the in-vehicle warning system 110 may perform an image analysis procedure (e.g., an object detection algorithm, a feature detection algorithm, a facial recognition algorithm, etc.) on the one or more images received from the one or more cameras 124 and/or the one or more baseline images or geometric digital models. In some embodiments, in block 506, the in-vehicle warning system 110 identifies background objects depicted or otherwise present within the one or more baseline images and/or geometric digital models (e.g., vehicle seats, a vehicle steering wheel, vehicle controls, and/or other vehicle components or stationary object within the vehicle 102). In such embodiments, in block 508, the in-vehicle warning system 110 subtracts the identified objects from the one or more images of the vehicle's 102 interior cabin space captured by the one or more cameras 124.

In block 510, the in-vehicle warning system 110 identifies or otherwise determines whether there are any occupants present within the vehicle 102. To do so, the in-vehicle warning system 110 analyzes the remaining objects within the one or more captured images to determine whether any are indicative of an occupant (e.g., an operator, an adult, a child, dependent, pet, etc.) being present within the vehicle 102.

In block 512, the in-vehicle warning system 110 determines the location of one or more occupants identified as being present within the vehicle 102. In some embodiments, the in-vehicle warning system 110 determines whether an identified occupant is located in an operator's seat (e.g., a driver's seat) or a different seat of the vehicle 102.

EXAMPLES

Illustrative examples of the technologies disclosed herein are provided below. An embodiment of the technologies may include any one or more, and any combination of, the examples described below.

Example 1 includes an in-vehicle warning system to generate a warning based on environmental conditions sensed in a vehicle, the in-vehicle warning system including: a vehicle monitoring module to: (i) determine whether an operator of the vehicle is present, (ii) determine whether a non-operator occupant is present in the vehicle, and (iii) determine whether environmental conditions sensed within the vehicle satisfy a reference condition threshold; and an emergency action module to perform an emergency action in response to: (i) a determination that the environmental conditions sensed within the vehicle satisfy the reference condition threshold, (ii) a determination that the operator of the vehicle is not present, and (iii) a determination that the non-operator occupant is present in the vehicle.

Example 2 includes the subject matter of Example 1, and wherein to determine whether the environmental conditions satisfy the reference condition threshold includes to determine the presence of an emergency event in response to a determination that the environmental conditions sensed within the vehicle satisfy the reference condition threshold; and wherein to perform the emergency action includes to alert the operator of the presence of the emergency event.

Example 3 includes the subject matter of any of Examples 1 and 2, and wherein to alert the operator includes to transmit a notification message to a mobile computing device of the operator.

Example 4 includes the subject matter of any of Examples 1-3, and wherein to transmit the notification message to the mobile computing device of the operator includes to transmit the notification message to the mobile computing device via a text message.

Example 5 includes the subject matter of any of Examples 1-4, and wherein the notification message includes at least one of: information indicative of the presence of the non-operator occupant in the vehicle, information indicative of the environmental conditions sensed within the vehicle, an image captured by a camera positioned inside of the vehicle, or a video captured by the camera positioned inside of the vehicle.

Example 6 includes the subject matter of any of Examples 1-5, wherein to determine whether the environmental conditions satisfy the reference condition threshold includes to determine the presence of an emergency event in response to a determination that the environmental conditions sensed within the vehicle satisfy the reference condition threshold; and wherein to perform the emergency action includes to alert third-party emergency services of the emergency event.

Example 7 includes the subject matter of any of Examples 1-6, and wherein to alert the third-party emergency services includes to transmit a notification message to an emergency services system.

Example 8 includes the subject matter of any of Examples 1-7, and wherein to perform the emergency action further includes to determine a location of the vehicle; and wherein the notification message includes the determined location of the vehicle.

Example 9 includes the subject matter of any of Examples 1-8, and wherein to perform the emergency action includes to control one or more components of the vehicle.

Example 10 includes the subject matter of any of Examples 1-9, and wherein to control one or more components of the vehicle includes at least one of open a window of the vehicle, turn on the vehicle, turn off the vehicle, control the temperature inside of the vehicle, activate a horn of the vehicle, flash one or more lights of the vehicle, control a door lock of the vehicle, or activate an alarm of the vehicle.

Example 11 includes the subject matter of any of Examples 1-10, and wherein the vehicle monitoring module is further to: receive an image of an interior cabin of the vehicle captured by a camera positioned within the vehicle; compare the captured image of the interior cabin to a baseline representation of the interior cabin; identify one or more occupants of the vehicle based on the comparison; and determine a location of each identified occupant.

Example 12 includes the subject matter of any of Examples 1-11, and wherein the vehicle monitoring module is further to identify one or more background objects within the baseline representation of the interior cabin; and wherein to compare the captured image of the interior cabin to the baseline representation of the interior cabin includes to remove the one or more background objects identified within the baseline representation from the captured image of the interior cabin.

Example 13 includes the subject matter of any of Examples 1-13, and wherein the baseline representation of the interior cabin of the vehicle includes at least one of a baseline image of the interior cabin previously captured by the camera positioned within the vehicle or a geometrically modeled representation of the interior cabin.

Example 14 includes the subject matter of any of Examples 1-13, and wherein to determine whether the operator of the vehicle is present includes to determine whether an identified occupant is located in a driver seat of the vehicle; and wherein to determine whether the non-operator occupant is present in the vehicle includes to determine whether another identified occupant is located in a seat different from the driver seat.

Example 15 includes the subject matter of any of Examples 1-14, and wherein the vehicle monitoring module is further to receive cabin data captured by at least one sensor positioned within the vehicle.

Example 16 includes the subject matter of any of Examples 1-15, and wherein the at least one sensor includes at least one environmental condition sensor; wherein the received cabin data includes environmental condition data captured by the environmental condition sensor and indicative of an environmental condition inside of the vehicle; and wherein to determine whether the environmental conditions sensed within the vehicle satisfy the reference condition threshold includes to compare the environmental condition data captured by the at least one environmental condition sensor with the reference condition threshold.

Example 17 includes the subject matter of any of Examples 1-16, and wherein the at least one environmental sensor includes at least one of a temperature sensor or an air quality sensor.

Example 18 includes the subject matter of any of Examples 1-17, and wherein the at least one environmental sensor includes at least one of a carbon monoxide (CO) sensor or a carbon dioxide ($CO_2$) sensor.

Example 19 includes the subject matter of any of Examples 1-18, and wherein the received cabin data includes at least one of occupant movement data indicative of a movement of the non-operator occupant within the vehicle, occupant physiological data indicative of one or more vital signs of the non-operator occupant, occupant characteristic data indicative of a physical characteristic of the non-operator occupant, or occupant activity data indicative of an activity of the non-operator occupant; and wherein to determine whether the non-operator occupant is present in the vehicle includes to determine whether the non-operator occupant is present in the vehicle based on the at least one of the occupant movement data, the occupant physiological data, the occupant characteristic data, or the occupant activity data captured by the at least one sensor.

Example 20 includes the subject matter of any of Examples 1-19, and wherein the at least one sensor includes at least one of a motion sensor, a breathing detection sensor, a heart rate sensor, a microphone, or a biometric sensor.

Example 21 includes the subject matter of any of Examples 1-20, and wherein the at least one sensor includes at least one wearable sensor configured to be worn by the non-operator occupant of the vehicle.

Example 22 includes the subject matter of any of Examples 1-21, and wherein the emergency action module is further to determine whether an override is activated; and wherein to perform the emergency action in response to a determination that the environmental conditions sensed within the vehicle satisfy the reference condition threshold, a determination that the operator of the vehicle is not present, and a determination that the non-operator occupant is present in the vehicle includes to perform the emergency action in response to: (i) a first determination that the environmental conditions sensed within the vehicle satisfy the reference condition threshold, (ii) a second determination that the operator of the vehicle is not present, (iii) a third determination that the non-operator is present in the vehicle, and (iv) a fourth determination that the override is not activated.

Example 23 includes a method for generating a warning based on environmental conditions sensed in a vehicle, the method including: determining, by an in-vehicle warning system of the vehicle, whether an operator of the vehicle is present; determining, by the in-vehicle warning system, whether a non-operator occupant is present in the vehicle; determining, by the in-vehicle warning system, whether environmental conditions sensed within the vehicle satisfy a reference condition threshold; and performing, by the in-vehicle warning system, an emergency action in response to: (i) determining that the environmental conditions sensed within the vehicle satisfy the reference condition threshold, (ii) determining that the operator of the vehicle is not present, and (iii) determining that the non-operator occupant is present in the vehicle.

Example 24 includes the subject matter of Example 23, and wherein determining whether the environmental conditions satisfy the reference condition threshold includes determining the presence of an emergency event in response to the environmental conditions sensed within the vehicle satisfying the reference condition threshold; and wherein performing the emergency action includes alerting the operator of the presence of the emergency event.

Example 25 includes the subject matter of any of Examples 23 and 24, and wherein alerting the operator includes transmitting a notification message to a mobile computing device of the operator.

Example 26 includes the subject matter of any of Examples 23-25, and wherein transmitting the notification message to the mobile computing device of the operator includes transmitting the notification message to the mobile computing device via a text message.

Example 27 includes the subject matter of any of Examples 23-26, and wherein the notification message includes at least one of: information indicative of the presence of the non-operator occupant in the vehicle, information indicative of the environmental conditions sensed within the vehicle, an image captured by a camera positioned inside of the vehicle, or a video captured by the camera positioned inside of the vehicle.

Example 28 includes the subject matter of any of Examples 23-27, and wherein determining whether the environmental conditions satisfy the reference condition threshold includes determining the presence of an emergency event in response to the environmental conditions sensed within the vehicle satisfying the reference condition threshold; and wherein performing the emergency action includes alerting third-party emergency services of the emergency event.

Example 29 includes the subject matter of any of Examples 23-28, and wherein alerting the third-party emergency services includes transmitting a notification message to an emergency services system.

Example 30 includes the subject matter of any of Examples 23-29, and wherein performing the emergency action further includes determining a location of the vehicle; and wherein the notification message includes the determined location of the vehicle.

Example 31 includes the subject matter of any of Examples 23-30, and wherein performing the emergency action includes controlling one or more components of the vehicle.

Example 32 includes the subject matter of any of Examples 23-31, and wherein controlling one or more components of the vehicle includes at least one of opening a window of the vehicle, turning on the vehicle, turning off the vehicle, controlling the temperature inside of the vehicle, activating a horn of the vehicle, flashing one or more lights of the vehicle, controlling a door lock of the vehicle, or activating an alarm of the vehicle.

Example 33 includes the subject matter of any of Examples 23-32, and further including: receiving, by the in-vehicle warning system, an image of an interior cabin of the vehicle captured by a camera positioned within the vehicle; comparing, by the in-vehicle warning system, the captured image of the interior cabin to a baseline representation of the interior cabin; identifying, by the in-vehicle warning system, one or more occupants of the vehicle based on the comparison; and determining, by the in-vehicle warning system, a location of each identified occupant.

Example 34 includes the subject matter of any of Examples 23-33, and further including identifying, by the in-vehicle warning system, one or more background objects within the baseline representation of the interior cabin; and wherein comparing the captured image of the interior cabin to the baseline representation of the interior cabin includes removing the one or more background objects identified within the baseline representation from the captured image of the interior cabin.

Example 35 includes the subject matter of any of Examples 23-34, and wherein the baseline representation of the interior cabin of the vehicle includes at least one of a baseline image of the interior cabin previously captured by the camera positioned within the vehicle or a geometrically modeled representation of the interior cabin.

Example 36 includes the subject matter of any of Examples 23-35, and wherein determining whether the operator of the vehicle is present includes determining whether an identified occupant is located in a driver seat of the vehicle; and wherein determining whether the non-operator occupant is present in the vehicle includes determining whether another identified occupant is located in a seat different from the driver seat.

Example 37 includes the subject matter of any of Examples 23-36, and further including receiving, by the in-vehicle warning system, cabin data captured by at least one sensor positioned within the vehicle.

Example 38 includes the subject matter of any of Examples 23-37, and wherein the at least one sensor includes at least one environmental condition sensor; wherein the received cabin data includes environmental condition data captured by the environmental condition sensor and indicative of an environmental condition inside of the vehicle; and wherein determining whether the environmental conditions sensed within the vehicle satisfy the reference condition threshold includes comparing the environmental condition data captured by the at least one environmental condition sensor with the reference condition threshold.

Example 39 includes the subject matter of any of Examples 23-38, and wherein the at least one environmental sensor includes at least one of a temperature sensor or an air quality sensor.

Example 40 includes the subject matter of any of Examples 23-39, and wherein the at least one environmental sensor includes at least one of a carbon monoxide (CO) sensor or a carbon dioxide ($CO_2$) sensor.

Example 41 includes the subject matter of any of Examples 23-40, and wherein the received cabin data includes at least one of occupant movement data indicative of a movement of the non-operator occupant within the vehicle, occupant physiological data indicative of one or more vital signs of the non-operator occupant, occupant characteristic data indicative of a physical characteristic of the non-operator occupant, or occupant activity data indicative of an activity of the non-operator occupant; and wherein determining whether the non-operator occupant is present in the vehicle includes determining whether the non-operator occupant is present in the vehicle based on the at least one of the occupant movement data, the occupant physiological data, the occupant characteristic data, or the occupant activity data captured by the at least one sensor.

Example 42 includes the subject matter of any of Examples 23-41, and wherein the at least one sensor includes at least one of a motion sensor, a breathing detection sensor, a heart rate sensor, a microphone, or a biometric sensor.

Example 43 includes the subject matter of any of Examples 23-42, and wherein the at least one sensor includes at least one wearable sensor configured to be worn by the non-operator occupant of the vehicle.

Example 44 includes the subject matter of any of Examples 23-43, and further including determining, by the in-vehicle warning system, whether an override is activated; and wherein performing the emergency action in response to determining that the environmental conditions sensed within the vehicle satisfy the reference condition threshold, the operator of the vehicle is not present, and the non-operator occupant is present in the vehicle includes performing the emergency action in response to: (i) determining that the environmental conditions sensed within the vehicle satisfy the reference condition threshold, (ii) determining that the operator of the vehicle is not present, (iii) determining that the non-operator occupant is present in the vehicle, and (iv) determining that the override is not activated.

Example 45 includes an in-vehicle warning system to generate a warning based on environmental conditions sensed in a vehicle, the in-vehicle warning system including: a processor; and a memory having stored therein a plurality of instructions that when executed by the processor cause the in-vehicle warning system to perform the method of any of Examples 23-44.

Example 46 includes one or more machine readable media including a plurality of instructions stored thereon that in response to being executed result in an in-vehicle warning system performing the method of any of Examples 23-44.

Example 47 includes an in-vehicle warning system to generate a warning based on environmental conditions sensed in a vehicle, the in-vehicle warning system including means for performing the method of any of Examples 23-44.

The invention claimed is:

1. An in-vehicle warning system to generate a warning based on environmental conditions sensed in a vehicle, the in-vehicle warning system comprising:
a vehicle monitoring module to: (i) determine whether an operator of the vehicle is present, (ii) determine whether a non-operator occupant is present in the vehicle, and (iii) determine whether environmental conditions sensed within the vehicle satisfy a reference condition threshold;
an emergency action module to transmit an alert notification message to a mobile computing device of the operator in response to: (i) a determination that the environmental conditions sensed within the vehicle satisfy the reference condition threshold, (ii) a determination that the operator of the vehicle is not present, and (iii) a determination that the non-operator occupant is present in the vehicle, wherein the alert notification message comprises an image captured by a camera positioned inside of the vehicle or a video captured by the camera positioned inside of the vehicle; and
a system override controllable by the operator to prevent transmission of the alert notification message when activated, wherein the emergency action module is to transmit the alert notification message regardless of the activation of the system override in response to a determination that at least one environmental condition sensed within the vehicle is greater than an upper threshold.

2. The in-vehicle warning system of claim 1, wherein to transmit the alert notification message to the mobile computing device of the operator comprises to transmit the notification message to the mobile computing device via a text message.

3. The in-vehicle warning system of claim 1, wherein the alert notification message further comprises at least one of: information indicative of the presence of the non-operator occupant in the vehicle, information indicative of the environmental conditions sensed within the vehicle.

4. The in-vehicle warning system of claim 1, wherein to determine whether the environmental conditions satisfy the reference condition threshold comprises to determine the presence of an the emergency event in response to a determination that the environmental conditions sensed within the vehicle satisfy the reference condition threshold; and
wherein the emergency action module is further to at least one of alert third-party emergency services of the emergency event or control one or more components of the vehicle.

5. The in-vehicle warning system of claim 4, wherein to alert the third-party emergency services comprises to transmit the alert notification message to an emergency services system.

6. The in-vehicle warning system of claim 5, wherein the emergency action module is further to determine a location of the vehicle; and
wherein the alert notification message comprises the determined location of the vehicle.

7. The in-vehicle warning system of claim 4, wherein to control one or more components of the vehicle comprises at least one of open a window of the vehicle, turn on the vehicle, turn off the vehicle, control the temperature inside of the vehicle, activate a horn of the vehicle, flash one or more lights of the vehicle, control a door lock of the vehicle, or activate an alarm of the vehicle.

8. The in-vehicle warning system of claim 1, wherein the vehicle monitoring module is further to:
receive an image of an interior cabin of the vehicle captured by the camera positioned within the vehicle;
compare the captured image of the interior cabin to a baseline representation of the interior cabin;
identify one or more occupants of the vehicle based on the comparison; and determine a location of each identified occupant.

9. The in-vehicle warning system of claim 8, wherein the vehicle monitoring module is further to identify one or more background objects within the baseline representation of the interior cabin; and
wherein to compare the captured image of the interior cabin to the baseline representation of the interior cabin comprises to remove the one or more background objects identified within the baseline representation from the captured image of the interior cabin.

10. The in-vehicle warning system of claim 1, wherein the vehicle monitoring module is further to receive cabin data captured by at least one sensor positioned within the vehicle.

11. The in-vehicle warning system of claim 10, wherein the at least one sensor comprises at least one environmental condition sensor;
wherein the received cabin data comprises environmental condition data captured by the environmental condition sensor and indicative of an environmental condition inside of the vehicle; and
wherein to determine whether the environmental conditions sensed within the vehicle satisfy the reference condition threshold comprises to compare the environmental condition data captured by the at least one environmental condition sensor with the reference condition threshold.

12. The in-vehicle warning system of claim 11, wherein the at least one environmental sensor comprises at least one of a temperature sensor or an air quality sensor.

13. The in-vehicle warning system of claim 10, wherein the received cabin data comprises at least one of occupant movement data indicative of a movement of the non-operator occupant within the vehicle, occupant physiological data indicative of one or more vital signs of the non-operator occupant, occupant characteristic data indicative of a physical characteristic of the non-operator occupant, or occupant activity data indicative of an activity of the non-operator occupant;
wherein to determine whether the non-operator occupant is present in the vehicle comprises to determine whether the non-operator occupant is present in the vehicle based on the at least one of the occupant movement data, the occupant physiological data, the occupant characteristic data, or the occupant activity data captured by the at least one sensor; and
wherein the at least one sensor comprises at least one of a motion sensor, a breathing detection sensor, a heart rate sensor, a microphone, a biometric sensor, or a wearable sensor configured to be worn by the non-operator occupant of the vehicle.

14. The in-vehicle warning system of claim 1, wherein the emergency action module is further to determine whether the system override is activated; and
wherein to transmit the alert notification message to the mobile computing device of the operator in response to a determination that the environmental conditions sensed within the vehicle satisfy the reference condition threshold, a determination that the operator of the vehicle is not present, and a determination that the non-operator occupant is present in the vehicle comprises to transmit the alert notification message to the mobile computing device of the operator in response to: (i) a first determination that the environmental conditions sensed within the vehicle satisfy the reference condition threshold, (ii) a second determination that the operator of the vehicle is not present, (iii) a third determination that the non-operator is present in the vehicle, and (iv) a fourth determination that the system override is not activated.

15. One or more non-transitory machine readable media comprising a plurality of instructions stored thereon that in response to being executed by an in-vehicle warning system, cause the in-vehicle warning system to:
   determine whether an operator of the vehicle is present;
   determine whether a non-operator occupant is present in the vehicle;
   determine whether environmental conditions sensed within the vehicle satisfy a reference condition threshold;
   transmit an alert notification message to a mobile computing device of the operator in response to: (i) a determination that the environmental conditions sensed within the vehicle satisfy the reference condition threshold, (ii) a determination that the operator of the vehicle is not present, and (iii) a determination that the non-operator occupant is present in the vehicle, wherein the alert notification message comprises an image captured by a camera positioned inside of the vehicle or a video captured by the camera positioned inside of the vehicle;
   determine whether a system override of the in-vehicle warning system is activated, wherein the system override prevents transmission of the alert notification message when activate; and
   transmit the alert notification message regardless of the activation of the system override in response to a determination that at least one environmental condition sensed within the vehicle is greater than an upper threshold.

16. The one or more non-transitory machine readable media of claim 15, wherein to determine whether the environmental conditions satisfy the reference condition threshold comprises to determine the presence of an emergency event in response to a determination that the environmental conditions sensed within the vehicle satisfy the reference condition threshold; and
   wherein the plurality of instructions further cause the in-vehicle warning system, in response to the determination to transmit the alert notification message, to at least one of: (i) alert third-party emergency services of the emergency event or (ii) control one or more components of the vehicle.

17. The one or more non-transitory machine readable media of claim 15, wherein the plurality of instructions further cause the in-vehicle warning system to:
   receive an image of an interior cabin of the vehicle captured by a camera positioned within the vehicle;
   compare the captured image of the interior cabin to a baseline representation of the interior cabin;
   identify one or more occupants of the vehicle based on the comparison; and
   determine a location of each identified occupant.

18. The one or more non-transitory machine readable media of claim 15, wherein the plurality of instructions further cause the in-vehicle warning system to receive cabin data captured by at least one sensor positioned within the vehicle.

19. The one or more non-transitory machine readable media of claim 18, wherein the at least one sensor comprises at least one environmental condition sensor;
   wherein the received cabin data comprises environmental condition data captured by the environmental condition sensor and indicative of an environmental condition inside of the vehicle; and
   wherein to determine whether the environmental conditions sensed within the vehicle satisfy the reference condition threshold comprises to compare the environmental condition data captured by the at least one environmental condition sensor with the reference condition threshold.

20. The one or more non-transitory machine readable media of claim 18, wherein the received cabin data comprises at least one of occupant movement data indicative of a movement of the non-operator occupant within the vehicle, occupant physiological data indicative of one or more vital signs of the non-operator occupant, occupant characteristic data indicative of a physical characteristic of the non-operator occupant, or occupant activity data indicative of an activity of the non-operator occupant;
   wherein to determine whether the non-operator occupant is present in the vehicle comprises to determine whether the non-operator occupant is present in the vehicle based on the at least one of the occupant movement data, the occupant physiological data, the occupant characteristic data, or the occupant activity data captured by the at least one sensor; and
   wherein the at least one sensor comprises at least one of a motion sensor, a breathing detection sensor, a heart rate sensor, a microphone, a biometric sensor, or a wearable sensor configured to be worn by the non-operator occupant of the vehicle.

21. A method for generating a warning based on environmental conditions sensed in a vehicle, the method comprising:
   determining, by an in-vehicle warning system of the vehicle, whether an operator of the vehicle is present;
   determining, by the in-vehicle warning system, whether a non-operator occupant is present in the vehicle;
   determining, by the in-vehicle warning system, whether environmental conditions sensed within the vehicle satisfy a reference condition threshold;
   capturing, by a camera positioned inside the vehicle, an image or video of an interior cabin of the vehicle;
   transmitting, by the in-vehicle warning system, an alert notification message to a mobile computing device of the operator in response to: (i) determining that the environmental conditions sensed within the vehicle satisfy the reference condition threshold, (ii) determining that the operator of the vehicle is not present, and (iii) determining that the non-operator occupant is present in the vehicle, wherein the alert notification message comprises the image or video captured by the camera positioned inside of the vehicle;
   determining, by the in-vehicle warning system, whether a system override of the in-vehicle warning system is activated, wherein the system override prevents transmission of the alert notification message when activate; and
   ignoring, by the in-vehicle warning system, the activation of the system override in response to a determination that at least one environmental condition sensed within the vehicle is greater than an upper threshold.

22. The method of claim 21, wherein determining whether the environmental conditions satisfy the reference condition threshold comprises determining the presence of an emergency event in response to the environmental conditions sensed within the vehicle satisfying the reference condition threshold; and wherein in response to determining to transmit the alert notification message, the in-vehicle warning system further performing at least one of: (i) alerting the operator of the presence of the emergency event, (ii) alerting third-party emergency services of the emergency event, or (iii) controlling one or more components of the vehicle.

23. The method of claim 21, further comprising:

receiving, by the in-vehicle warning system, an image of an interior cabin of the vehicle captured by a camera positioned within the vehicle;

comparing, by the in-vehicle warning system, the captured image of the interior cabin to a baseline representation of the interior cabin;

identifying, by the in-vehicle warning system, one or more occupants of the vehicle based on the comparison; and determining, by the in-vehicle warning system, a location of each identified occupant.

* * * * *